Patented Apr. 6, 1948

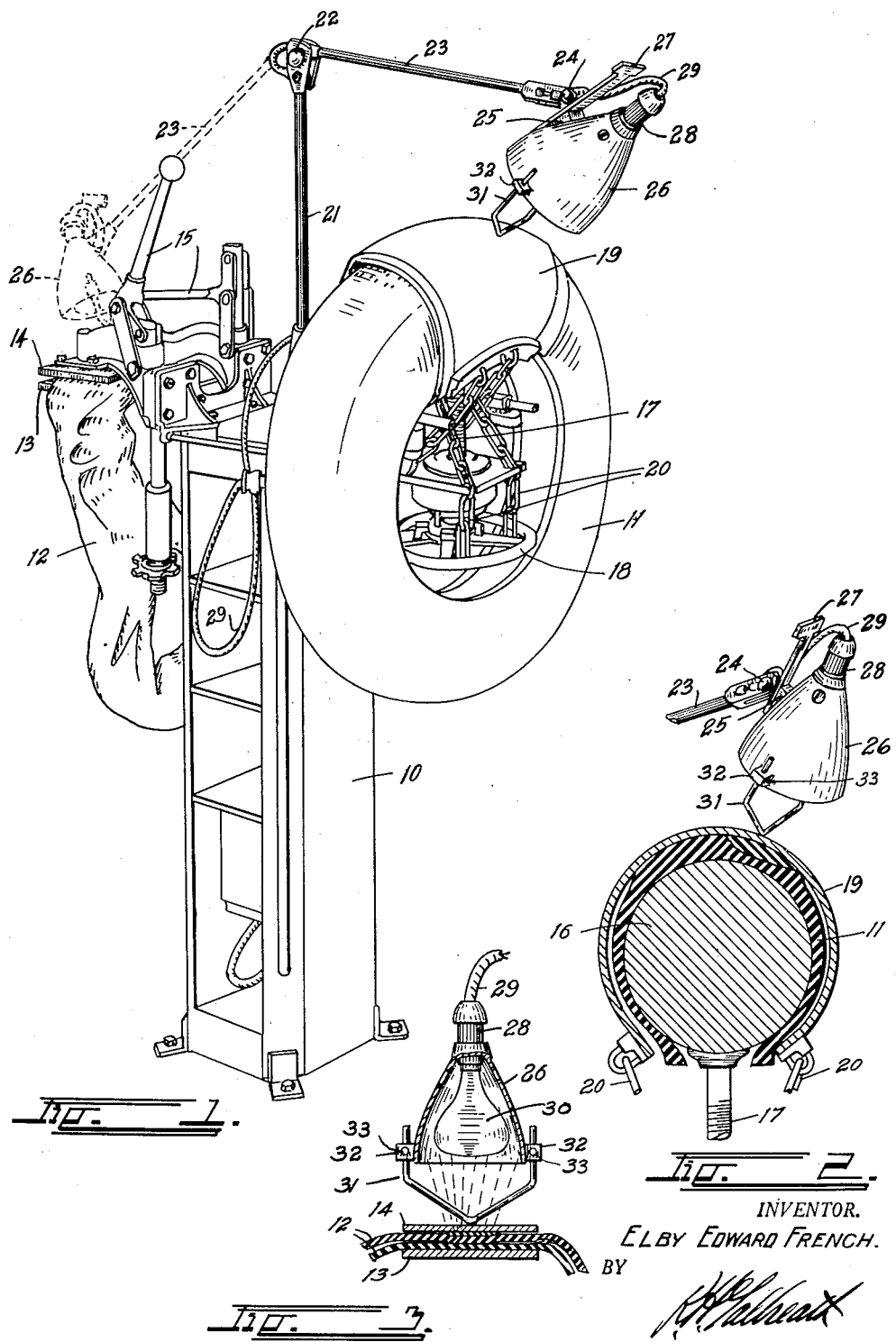

2,439,083

UNITED STATES PATENT OFFICE 2,439,083

TIRE REPAIR DEVICE

Elby Edward French, Denver, Colo., assignor to O. K. Ko-Op Rubber Welding System, Denver, Colo.

Application March 5, 1946, Serial No. 652,098

2 Claims. (Cl. 18—18)

This invention relates to a method for vulcanizing or curing repairs in rubber articles, more particularly in automotive tires, tubes, and casings. The principal object of the invention is to provide a method which will apply heat to the exterior portions of the repair so that the curing will be effected uniformly throughout the entire thickness thereof.

In the usual repair device, heat is applied to the surface of the repair by means of a hot plate heated with steam or electricity. This results in over-curing of the exterior in order to obtain the proper curing of the interior of the repair. With this invention, however, the heat is applied throughout the thickness of the repair so that a uniform cure is obtained without burning or scorching the surface portion.

Another object of the invention is to provide a method for curing tire repairs which will eliminate all heating appliances such as electric heating elements, steam jackets, etc.

A further object is to provide a highly efficient device for carrying out the improved method in the tire repair art.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of a tire repair device in which the invention is embodied;

Fig. 2 is an enlarged detail cross-section through a tire repair on the device of Fig. 1; and Fig. 3 is a detail section, illustrating the source of heat employed in attaining the repairs.

The drawing illustrates one device for using the improved process or method. The method, however, is not dependent upon this particular construction. The improved method makes use of infra-red light rays. It has been found that infra-red rays have unique penetrating properties which serve to interiorly heat any materials upon which the rays are focused without overheating the surfaces thereof.

This invention makes use of this unique property by focusing infra-red rays upon the raw rubber in a tire repair to effectively cure or vulcanize the repair rubber. It is essential that some means be provided for focusing the infra-red rays and for positioning the light source or the repair so that the rays will be focused on the latter to obtain optimum results.

In the construction illustrated, a pedestal 10 is provided with means for supporting a tire casing 11 at one side and a tire inner tube 12 at the other side. The inner tube 12 is supported on a vertically movable supporting plate 13 which can be clamped toward a stationary plate 14 by means of suitable clamping levers 15, or in any other desired manner.

The casing support comprises a curved arm 16, shaped to conform to the interior of the tire. The curved arm can be moved vertically by means of a jack screw 17 operated from a hand wheel 18. A thin, flexible, sheet metal shell 19 surrounds the repaired portion of the casing 11. The shell is tied down by means of clamping chains 20 so that when the arm 16 is forced upwardly, the casing will be clamped into the confines of the shell 19.

A rotatable standard 21 arises from the pedestal 10, terminating in a ball and socket joint 22. An adjustable arm 23 is mounted at one extremity in the ball-and-socket joint 22 and terminates in its other extremity in a second ball and socket joint 24.

A lamp bracket 25 is adjustably mounted in the second ball and socket joint 24. The bracket supports at its one extremity a light reflector 26, and at its other extremity a handle 27. The light reflector is provided with a lamp socket 28, from which a conductor cord 29 extends through the arm 23 into the standard 21 to any suitable source of electricity.

A conventional infra-red lamp globe 30 is screwed into the socket 26 with its filament at the focal point of the reflector 26. A U-shaped spacing rod 31 which is bent to provide a relatively pointed apex is mounted on and projects forwardly from the reflector 26. The extremities of the rod are adjustable in attachment ears 32 on the reflector 26 by means of set screws 33. The rod is adjusted with respect to the reflector 26 so that the rays will be concentrated over the mid-point of the repair to be vulcanized in alignment with the apex of the rod. Should a casing repair be made, the repair is placed over the curing arm 16 and under the shell 19, as shown in Fig. 2. The apex of the rod 31 is positioned against the shell 19 immediately over the repair so that the light rays will be focused upon the mid-section of the raw rubber in the repair. The light is now turned on and the curing quickly effected.

For curing repairs on the inner tube 12, the repaired portion of the tube is clamped between the plates 13 and 14, as shown in Fig. 3, and the arm 23 is swung and the reflector is directed, by means of the handle 27, to position the point of the rod 31 immediately over the repair, as shown in Fig. 3. The infra-red rays from the light are then concentrated upon the repaired portion of the tube to quickly effect the curing thereof.

While specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A tire repair device comprising in combination: a pedestal; means for supporting a tire casing at one side of said pedestal; a metal shell adapted to surround the tire casing when the latter is supported by said means; a supporting standard arising from said pedestal; an adjustable arm hinged to and extending from said standard over said casing supporting means; a lamp bracket hinged on the extremity of said arm; a lamp reflector carried by said bracket; an infra-red lamp in said reflector; and a V-shaped spacing rod adjustably secured to said reflector at its extremities and extending downwardly therefrom to contact said metal shell to support said reflector at any desired position and height over said casing.

2. A tire repair device comprising in combination: a pedestal; means for supporting a tire tube at one side of said pedestal; a metal plate adapted to overlie and contact said tube; a supporting standard arising from said pedestal; an adjustable arm hinged to and extending from said standard over said tube supporting means; a lamp bracket hinged on the extremity of said arm; a lamp reflector carried by said bracket; an infra-red lamp in said reflector; and a V-shaped spacing rod adjustably secured to said reflector at its extremities and extending downwardly therefrom into contact with said metal plate to support said reflector at the proper point over said tube.

ELBY EDWARD FRENCH.

REFERENCES CITED

The following references are of record in the file of this patent:

UNITED STATES PATENTS

| Number | Name | Date |
|---|---|---|
| 255,139 | Burr | Mar. 21, 1882 |
| 906,556 | Perkins | Dec. 15, 1908 |
| 1,631,943 | Urquhart et al. | June 7, 1927 |
| 2,042,855 | Merklein | June 2, 1936 |
| 2,112,440 | James | Mar. 29, 1938 |
| 2,315,124 | Luzius | Mar. 30, 1943 |
| 2,347,407 | Goodwin et al. | Apr. 25, 1944 |